Figure 1:
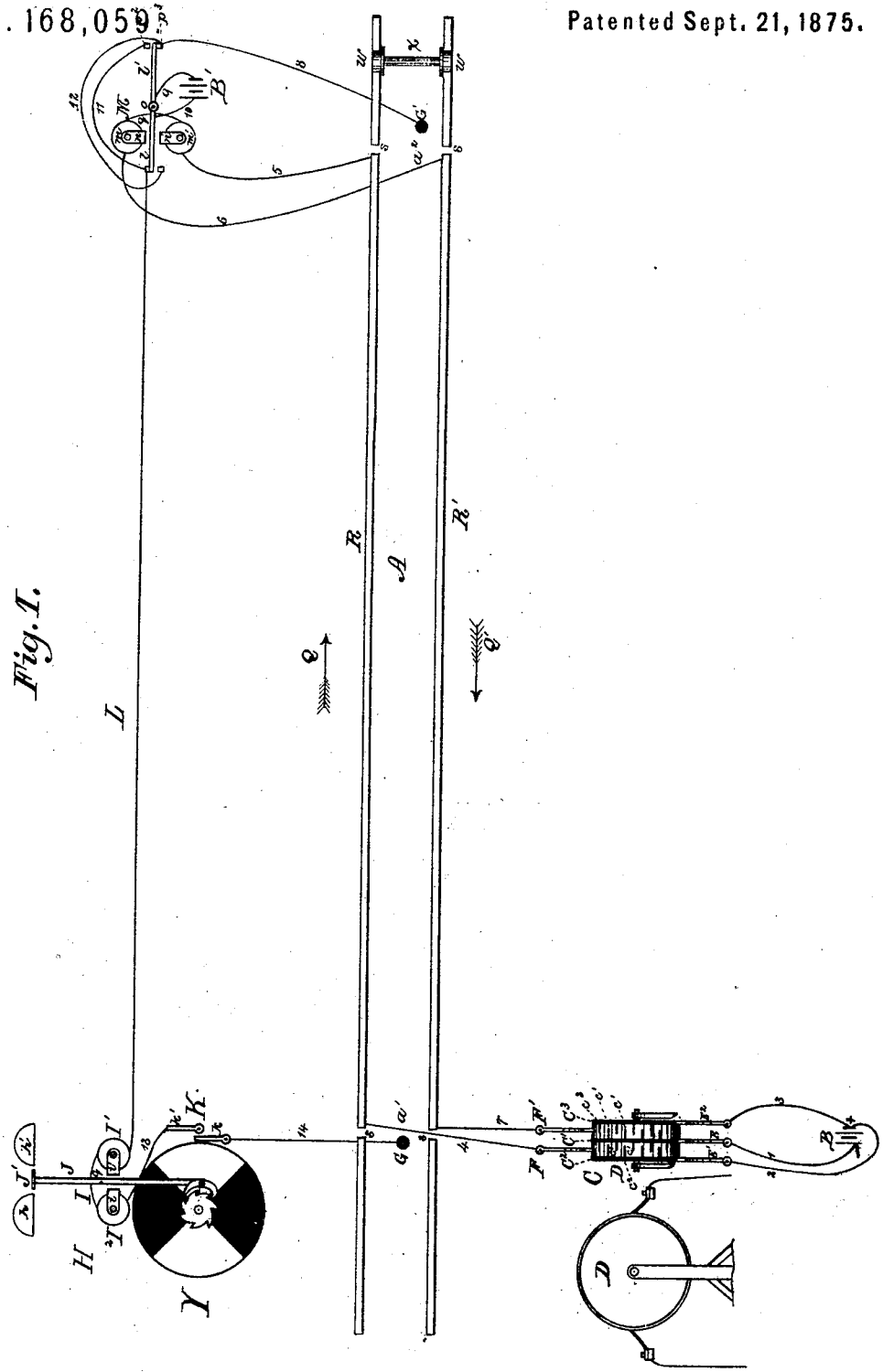

H. W. SPANG.
Electric Railway-Signal.

No. 168,059. Patented Sept. 21, 1875.

WITNESSES—
Philip W. Hale,
Parker H. Sweet Jr.

INVENTOR.
Henry W. Spang
per Wm Beale Hale
atty.

H. W. SPANG.
Electric Railway-Signal.

No. 168,059. Patented Sept. 21, 1875.

WITNESSES
Philip W. Hale,
Parker H. Sweet, Jr.

INVENTOR
Henry W. Spang,
per Wm Beale Hale,
Atty.

H. W. SPANG.
Electric Railway-Signal.
No. 168,059.
Patented Sept. 21, 1875.
5 Sheets--Sheet 4.
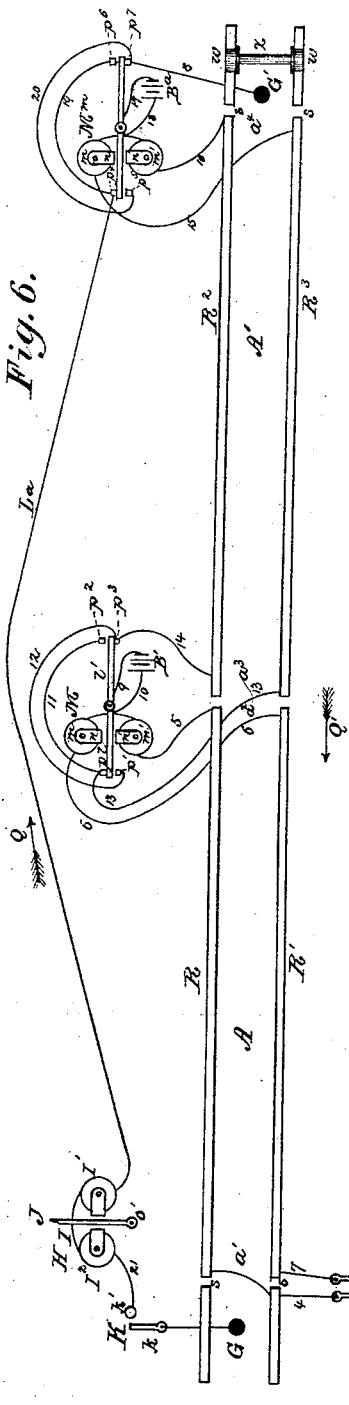
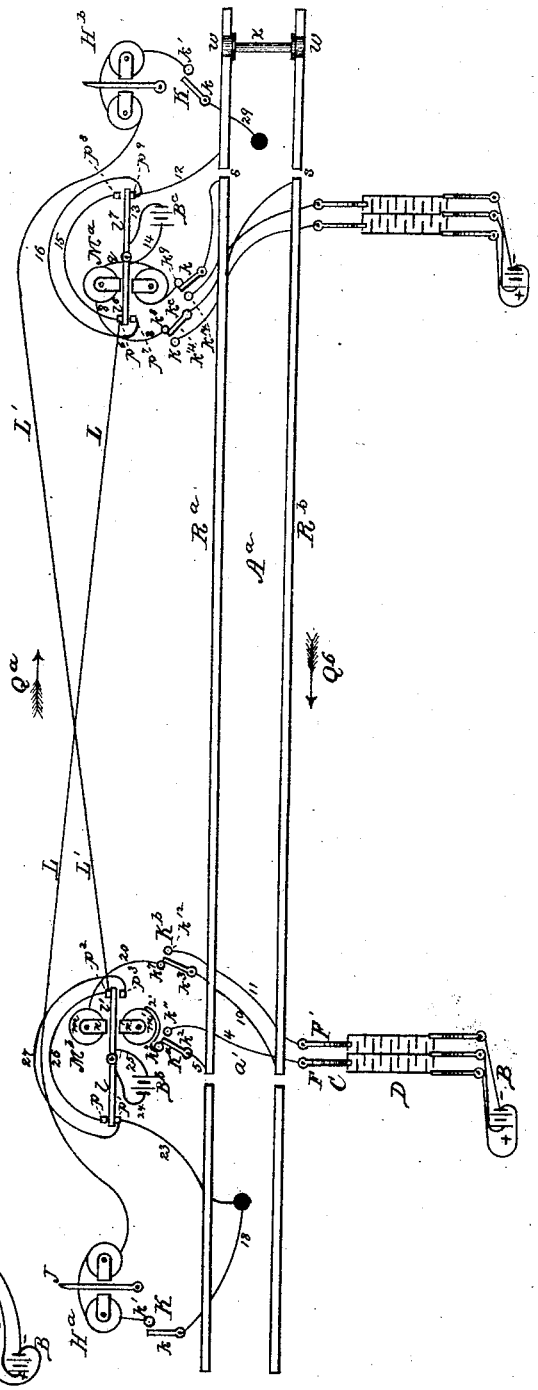
WITNESSES—
W. A. Daugerfield
Parker H. Sweet Jr.
INVENTOR—
Henry W. Spang
pu Wm Beale Hale,
Atty.

H. W. SPANG.
Electric Railway-Signal.

No. 168,059.    Patented Sept. 21, 1875.

WITNESSES —
W. A. Dangerfield
Parker H. Sweet Jr.

INVENTOR —
Henry W. Spang,
per Wm Beale Hale,
Atty

UNITED STATES PATENT OFFICE.

HENRY W. SPANG, OF READING, PENNSYLVANIA.

IMPROVEMENT IN ELECTRIC RAILWAY-SIGNALS.

Specification forming part of Letters Patent No. 168,059, dated September 21, 1875; application filed March 17, 1875.

*To all whom it may concern:*

Be it known that I, HENRY W. SPANG, of Reading, in the county of Berks and State of Pennsylvania, have invented certain new and useful Improvements in Electric Railway-Signal Apparatus and Circuits; and I do hereby declare that the following is a full, clear, and exact description thereof, which will enable others skilled in the art to which it pertains to make and use the same, reference being had to the accompanying drawing, and to the letters of reference marked thereon, which form a part of this specification.

My invention relates to that class of electrical railway-signaling apparatus, audible or visual, or both combined, which is operated in connection with the rails of an insulated section or sections of railway-track, and in which the electric circuit or circuits which control the signaling apparatus can only be properly brought into action, and a safety-signal given, when the opposite rails of the said insulated section or sections of track are not occupied or metallically connected, as by the wheels and axles of a locomotive or car.

It consists, first, in certain novel combinations and arrangements of the rails of an insulated section or sections of railway, one or more galvanic batteries or other sources of electricity, conductors, devices for changing, closing, and breaking circuit, and one or more signaling apparatus, audible or visual, or both combined, in which the safety-signal is indicated by a series of movements of signal, or series of bell-taps, or other series of signs or sounds, or by a single movement of signal, produced by, or dependent upon, a series of reverse currents of electricity, the whole being so arranged that said safety-signal can only be given when the opposite rails of said insulated section or sections of track are not metallically connected, as by the wheels and axles of a locomotive or car, or are not occupied by means of a series of reverse or opposite currents passing over the entire length of said rails, and the conductors forming the circuit or circuits which control the signaling apparatus, and cannot be given by a single current passing over them, thereby preventing the liability of the safety-signal being given by atmospheric electricity, such as produces lightning, aurora borealis, or earth-currents, or by any other accidental current, and particularly when the rails of said section or sections are occupied by a locomotive or car; second, in certain novel combinations and arrangements of conductors and a galvanic battery, by which a series of opposite or reverse currents will be transmitted; third, in an improved semaphoric signal apparatus, in which a visual signal rotating or moving upon its center, or a shaft, in one direction, is in combination with a toothed wheel, an impelling-escapement, and a lever which vibrates between the poles of an electro-magnet, when said magnet is alternately charged by a series of electric currents which alternately pass in opposite directions over the coils thereof; fourth, in a combination and arrangement of devices by means of which my invention may be used for the protection of two or more adjacent insulated sections of track at the same time, the combined length of said sections exceeding the length of railway-rails over which the current of a single galvanic battery can be with certainty employed for signaling purposes.

Figure 8:
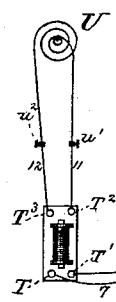
Figure 9:
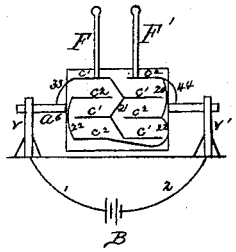

In the accompanying drawings or diagrams, Figure 1 represents my invention as applied to an insulated section of a double-track railway, and Figs. 2, 3, 4, 5, and 10 are modifications thereof. Fig. 6 shows my invention applied to two adjacent insulated sections of a double-track railway. Fig. 7 shows the manner of applying my invention to an insulated section of single-track railway. Fig. 8 represents the connections with an induction-coil and Geissler tube, when used as a visual signal. Fig. 9 is a modification, showing a novel combination of conductors, and a galvanic battery for transmitting a series of opposite or reverse currents of electricity.

In Fig. 1, A is an insulated section of railway-track a mile long, more or less. $a^1 a^2$ are the opposite ends thereof. The lines of rails R R$^1$ should each have metallic continuity throughout the length of the section by means of good metallic connections at each joint. The letter *s* indicates that rails in the same line are insulated or separated from each other at that point. B B$^1$ are galvanic batteries. C is an electric-circuit commutator or changer for transmitting a series of opposite or reverse electric currents. It consists of the continuous metallic strips $C^1$ $C^2$ $C^3$ fastened parallel to each other around the periphery $d$ of a wooden wheel, D, or a wheel with wooden or non-conducting rim. From the outside strips $C^2$ $C^3$ project short strips or arms $c^2$ $c^3$ toward but not reaching to the central strip $C^1$, from each side of which similar short strips or arms $c^1$ project between the series of short arms $c^2$ on one side, and series of short arms $c^3$ upon the opposite side, being separated from said short arms and from strips $C^2$ $C^3$ by intervening portions of the surface of the wheel, with which the strips and arms should all be sunk flush. E $E^1$ $E^2$ are metallic springs, or their equivalents, which should always press against and make good contact with the continuous metallic strips $C^1$ $C^2$ $C^3$. Springs $E^1$ and $E^2$ are the terminals of wires 2 and 3, both of which are connected with the negative pole of battery B. E is the terminal of wire 1, which is connected with the positive pole of battery B. F $F^1$ are metallic springs, which press upon the periphery of wheel D between the continuous strips $C^1$ $C^2$ $C^3$, and when the wheel D is revolved spring F contacts alternately with short arms or strips $c^1$ and $c^2$, and spring $F^1$ contacts alternately with short arms or strips $c^1$ and $c^3$. F is connected with a conducting-wire, 4, leading to line of rails R, and $F^1$ is connected with a conducting-wire, 7, leading to line of rails $R^1$. The said conducting-wires are insulated and embedded in the earth, or otherwise placed out of the way of passing trains or danger from accidental breakage. G $G'$ are metallic plates embedded in the earth, so as to make good earth-connection. H is a signaling apparatus, consisting of a polarized lever, J, vibrating on its fulcrum $o^1$ between the poles $i'$ $i$ of an electro-magnet, I, when the polarity of said poles is alternately changed by a series of opposite electric currents passing alternately through the coils of said electro-magnet, and operating the impelling-escapement $j$, the pallets $j^1$ and $j^2$ of which take into the teeth of wheel Z, moving it the space of one tooth at each half-vibration of lever J, and thus producing a corresponding movement in signal Y, the center of which is attached to shaft $o^2$ of the toothed wheel Z. To the upper end of lever J a hammer, $J^1$, is attached, and alternately strikes two bells, $h$ and $h'$, or can strike one bell at regular intervals when lever J vibrates. The semaphoric signal Y may consist of a wire frame covered with bunting, and in order that it may be readily observable the face of said signal may be divided into two or more divisions of contrasting colors.

It will be seen that in order to produce a complete revolution of the signal Y a series of alternate opposite or reverse currents of electricity must pass over the coils of electro-magnet I, as only by such a series of currents can lever J be vibrated, and it must perform a number of complete vibrations equal to half the number of teeth in wheel Z, or a half-vibration for each tooth, in order to cause such complete revolution. A series of bell-taps, of course, depends upon the same alternation of currents.

K is a circuit closer and breaker, consisting of a metallic lever, $k$, and a metallic conductor, $k^1$, with which lever $k$ can make or break contact, as desired. The object of this circuit closer and breaker is to keep the secondary or local signaling-circuit open when not required to be brought into action to operate the signaling apparatus, and thereby prevent the waste and weakening of the battery. L is a conducting-wire extending along the section of track A, connecting coil $I'$ of electro-magnet I with metallic conductor $p$, which is one of the limiting-points to the play of armature-lever $l$ at the opposite end of the section. M is a polarized relay-magnet of Siemens' or any other make, and is so arranged that when the polarity of the poles thereof is changed by a series of alternately opposite or reverse currents passing over the coils thereof it will simultaneously change the direction of the current over a secondary or local signaling circuit and apparatus, and thereby cause a series of audible or visual signals, or both combined, to be given by the apparatus, as heretofore explained. The polarized armature-lever $l$ vibrates on its fulcrum $o$ between the two metallic points $p$ $p^1$ when the polarity of the soft-iron poles $n$ $n'$ is alternately changed by a series of alternately-opposite currents passing over coils $m$ $m'$ and wire $q$, which connect said coils, and changing the polarity of the soft-iron cores thereof to which the poles $n$ $n'$ are attached. To the polarized lever $l$ of magnet M an additional lever, $l^1$, of soft iron or any other metal is attached, but insulated therefrom, so that there will not be metallic connection between the two levers. The lever $l^1$ will vibrate, of course, simultaneously with lever $l$, its play being limited by that of lever $l$, and its end alternately contacting with the two metallic points $p^2$ $p^3$. The conducting-wires indicated by numerals will be hereafter referred to in explaining the passage of electric currents over circuits formed by or composed partially of said wires.

When a locomotive or train approaches the end $a^1$ of insulated section of track A, in direction of arrow (⇒→) Q, a signalman at a signal-station can soon ascertain whether said section of track is clear or occupied, and also, during cold or dry weather, whether the rails are in a proper position and not broken, and notify the engineer of the approaching train accordingly. The lever K is moved to contact with conductor $K'$ by the signalman, and he then rotates wheel D of the commutator C, and should rails R $R^1$ of section of track A be clear and not occupied by the wheels connected by metallic axles of a preceding locomotive or train, and, also, should the rails of the section be in proper position and not broken, a series of alternate opposite currents of battery B will pass over rails R R$^1$ of section of track A and coils $m$ $m'$ of polarized relay-magnet M, and cause levers $l$ $l^1$ to vibrate and send a series of currents alternately in opposite directions from battery B$^1$ over wire L, signal apparatus H, circuit-closer K, and ground-plates G G$'$, and thereby cause a series of taps upon bells $h$ $h'$, and a series of movements of signal Y, to be given at short and regular intervals, said bell-taps and signal movements, or either of them separately, indicating safety, and they may be so arranged as to be heard and seen, or either, by the signalman at the station, and the engineer upon the approaching train.

While the wheel D of commutator C is being rotated, and springs F F$^1$ contact with short arms or conductors $c^1$ $c^3$, the route of current of battery B will be as follows: From positive (+) pole of said battery over wire 1, spring E, continuous strip or conductor C$^1$, short arm or conductor $c^1$, spring F, wire 4, line of rails R, wire 5, coil $m'$, wire $q$, coil $m$, wire 6, line of rails R$^1$, wire 7, spring F$^1$, short conductor $c^3$, continuous strip or conductor C$^3$, spring E$^2$, and wire 3, to negative pole of battery, thereby changing polarity of iron cores and poles $n$ $n^1$ of relay M, and causing lever $l$ to contact with metallic point $p$, and lever $l^1$ with metallic point $p^3$, and thereby directing current of battery B$^1$ over wire 10, lever $l$, point $p$, wire L, coils I$^1$ I$^2$, and wire $q'$ of signaling electro-magnet, wire 13, conductor $k^1$, and lever $k$ of circuit closer and breaker K, wire 14, and ground-plate G, while the complementary current flows from ground-plate G$^1$ over wire 8, point $p^3$, lever $l^1$, and wire 9, to the negative pole of battery, its influence changing the polarity of the iron cores and poles of coils I$^1$ I$^2$, and causing polarized lever J to strike bell $h$ with hammer J$^1$, and escapement $j$ to move toothed wheel Z one tooth and communicate a short movement to signal Y.

After short conductors $c^1$ $c^3$ leave springs F F$^1$, and short conductors $c^2$ and $c^1$ contact with said springs, the route of current of battery B is as follows: From positive (+) pole of said battery over wire 1, spring E, continuous conductor C$^1$ of the commutator, short conductor $c^1$, spring F$^1$, wire 7, rails R$^1$, wire 6, coil $m$ of relay M, wire $q$, coil $m'$ of relay M, wire 5, line of rails R, wire 4, spring F, short conductors $c^2$, and continuous conductor C$^2$ of the commutator, and wire 2, to negative pole of battery, changing by its influence the polarity of iron cores and poles $n$ $n'$ of relay-magnet M, and causing lever $l$ to contact with metallic point $p^1$, and lever $l^1$ with metallic point $p^2$, thus directing current of battery B$^1$ over wire 10, lever $l$, point $p^1$, wire 12, point $p^3$, wire 8, and ground-plate G$^1$, to earth, the complementary current flowing over ground-plate G, wire 14, lever $k$, conductor $k^1$, wire 13, coil I, wire $q'$, coil I$^1$, wire L, point $p$, wire 13, point $p^2$, lever $l^1$, wire 9, to negative pole of battery, changing the polarity of iron cores and poles $i'$ $i$ of coils I I$^1$, and causing lever J to strike bell $h^1$ with hammer J$^1$, and escapement $j$ to again move toothed wheel Z one tooth, and communicate another short movement to signal Y.

By the rotation of wheel D of commutator C any number of opposite or reverse currents can be sent over the main or primary, and local or secondary, circuits, as hereinbefore explained, alternately in the directions indicated by arrows (⇒→) Q and (←⇐) Q$^1$, and a corresponding number of alternate taps will be given upon bells $h$ and $h'$, and a similar number of movements will be made by signal Y, when the rails of insulated section of track A are not occupied by a locomotive or car, and said rails are in their proper position and not broken.

Should the rails R R$^1$ of section of track A be occupied, and metallically connected by wheels $w$ $w$, united by their axle $x$, of a preceding locomotive or train, or in any other manner, or a rail be removed or broken during cold or dry weather, it will be impossible to charge coils $m$ $m'$ of relay M to change the polarity of poles $n$ $n'$ by alternate opposite currents from the battery B, owing to said wheels and axle, or other metallic connection of opposite rails, shunting, or short-circuiting, the said currents passing over lines of rails R R$^1$, and preventing them from passing over the coils of relay-magnet M; or, owing to the broken or removed rail, interrupting the circuit of said currents, and consequently a series of alternately-opposite currents from battery B$^1$ will not be caused to pass over the local or secondary or signaling circuit, as hereinbefore described, and a series of bell-taps and movements of signal Y, indicating safety, will not be given.

After the wheel D of commutator C has been rotated, the said wheel D should be adjusted or set so that springs F F$^1$ do not touch conductors $c^1$ $c^3$ or $c^2$ $c^1$, and the lever $k$ of circuit closer and breaker K should be removed from contact with conductor $k^1$, so as to open circuits and prevent waste and weakening of batteries B and B$^1$.

Figure 2:
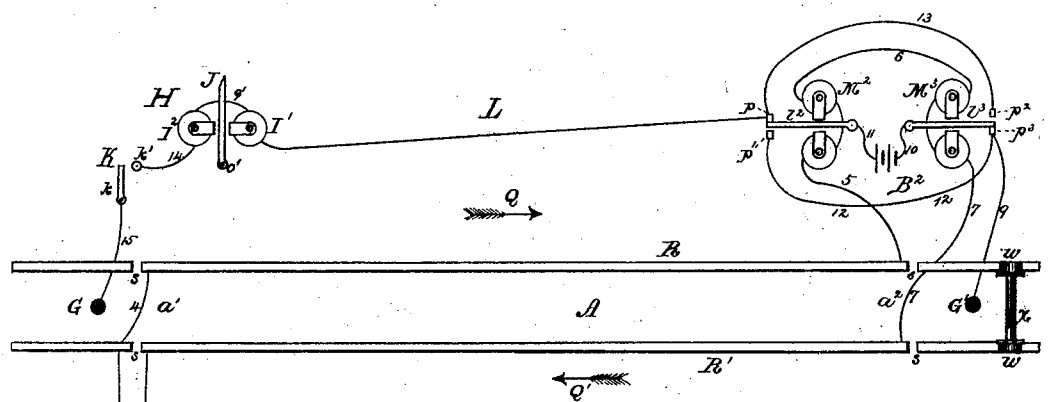
Figure 3:
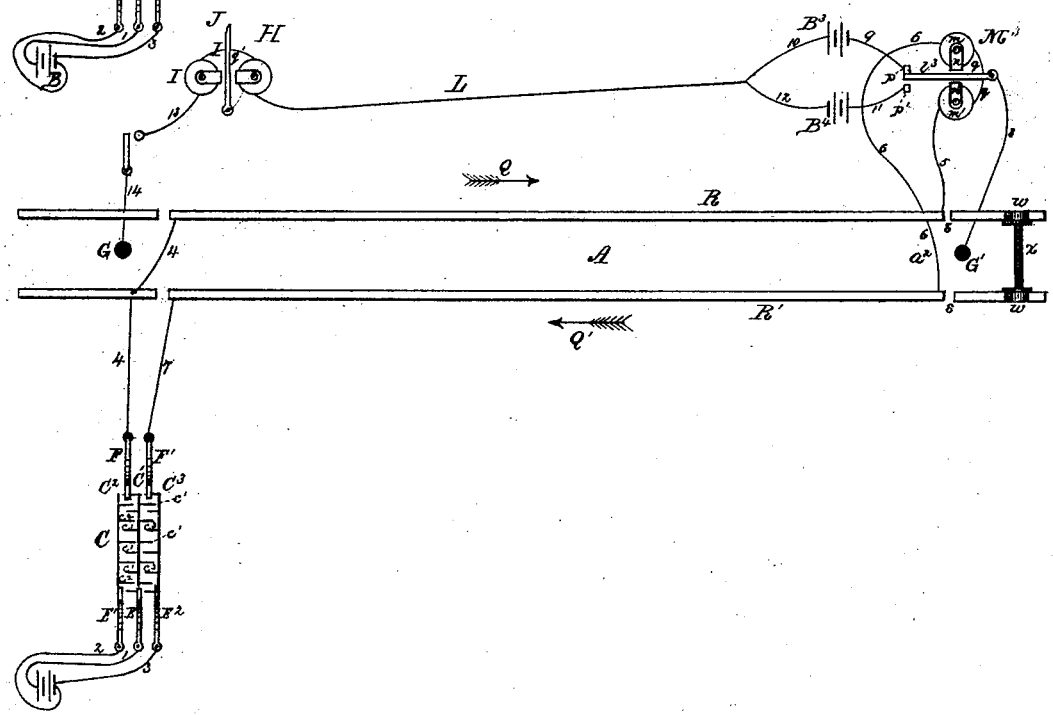
Figure 4:
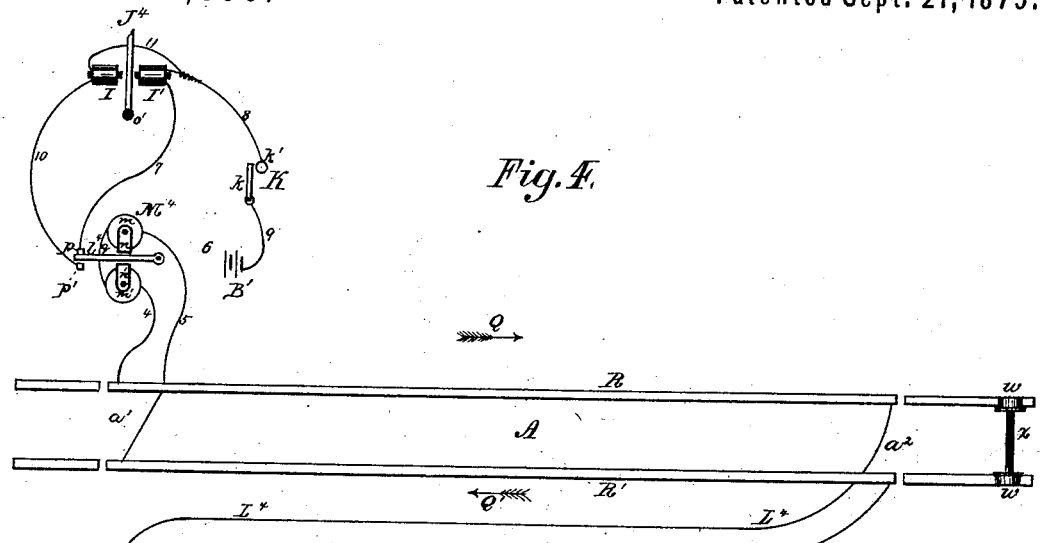

Figs. 2, 3, and 4 show modifications of the hereinbefore-described invention. In Fig. 2 two polarized relay-magnets, M$^2$ M$^3$, each having a single lever, $l^2$ and $l^3$, and one battery, B$^2$, are employed to transmit a series of alternate opposite currents over the local or secondary circuit to operate signal apparatus H. In Fig. 3 one polarized relay-magnet, M$^3$, having a single lever, $l^3$, and two batteries, B$^3$ and B$^4$, are employed for the same purpose. In Fig. 4 springs F F$^1$ of commutator C are connected to rails R R$^1$ at end $a^2$, instead of at end $a^1$, of section of track A, by long wires L$^4$ L$^5$, and polarized relay-magnet M$^4$, having single lever $l^4$, is connected to said rails by short wires 4 and 5 at end $a^1$, instead of at end $a^2$. The signal-lever J$^4$ in this modification is of soft iron, and not polarized.

When the lever $k$, Fig. 4, of circuit closer and breaker K, contacts with conductor $k^1$, and lever $l^4$ of magnet $M^4$ touches metallic point $p$, the current of battery $B^1$ passes from its positive pole (+) over wire 6, lever $l^4$, point $p$, wire 7, coil of electro-magnet $I^1$, wire 8, conductor $k^1$, and lever $k$ of circuit-closer K, and wire 9, to the negative pole of battery, thereby charging soft-iron core of $i^1$ of magnet $I^1$, which then attracts lever $J^4$, causing it to operate an audible or visual signal, or both, as hereinbefore described; and when lever $l^4$ touches metallic point $p^1$, owing to the change of primary circuit by commutator C, the current of battery $B^1$ passes from the positive pole (+) over wire 6, lever $l^4$, point $p^1$, wire 10, coil of magnet I, wires 11 and 8, conductor $k^1$, lever $k$, and wire 9, to negative pole of battery, thereby charging core $i$ of magnet I, which attracts lever $J^4$ to again operate an audible or visual signal, or both, as before described. The soft-iron signal-lever $J^4$ in this modification may be replaced by a polarized lever, and the currents of two different batteries directed respectively over the coils of magnets I and $I^1$, for operating said lever. The details of such replacement will readily suggest themselves to one familiar with electrical apparatus.

Figure 5:
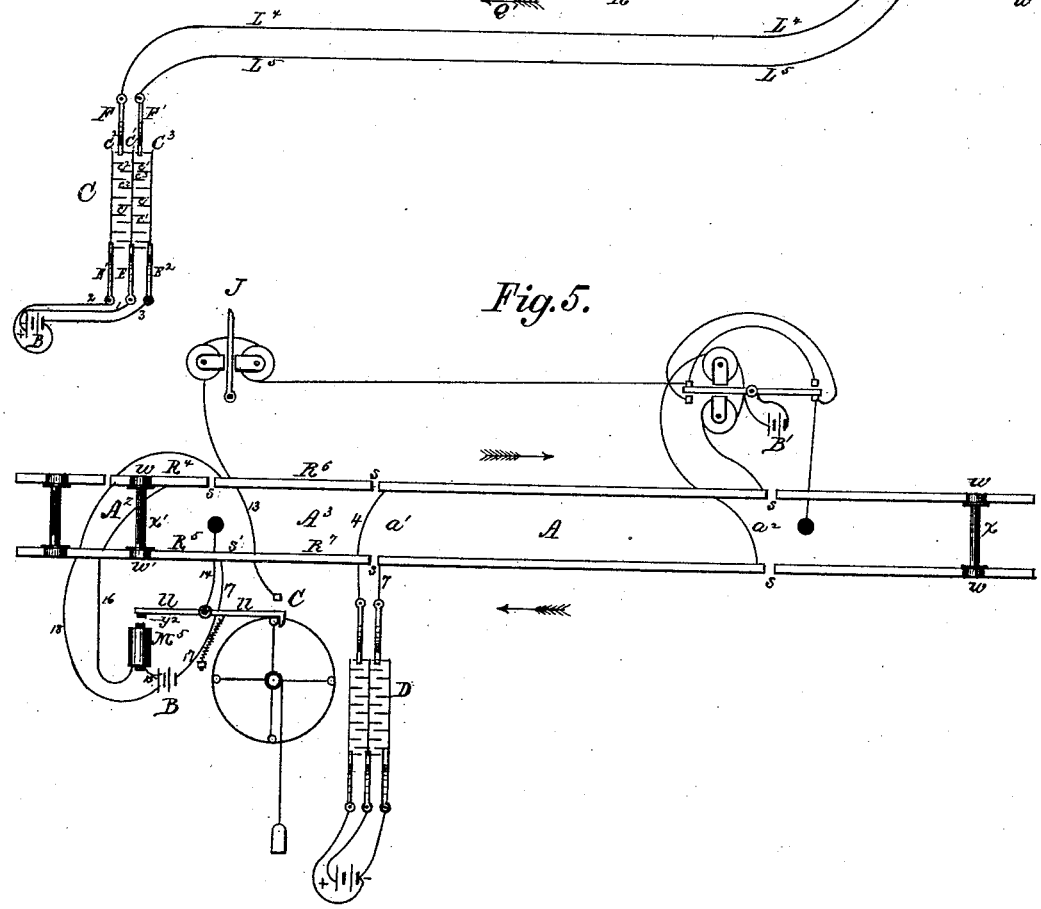

Fig. 5 is another modification, showing my invention applied to an insulated section of a double-track railway, in which the movement of wheel D of commutator C is under the control of an approaching locomotive or train, and is so arranged that when section of track A is clear, and the rails are in proper position, a series of bell-taps or other signals, or both an audible and a visual signal, will be automatically given, and be heard or seen, or both, by the engineer of the approaching train. By this arrangement the engineer is relieved of dependence upon a signalman for the operation of the commutator C, for producing proper action in the signal apparatus.

The wheel D of commutator C is rotated by means of a weight, N, and cord $N^1$, said cord being wound around the shaft $d^3$. Lever $l\ l$ vibrates on its fulcrum $o^3$, and has a detent, $d^5$, attached at one end, and an armature, $y^2$, at the opposite end. When armature $y^2$ is not attracted by cores of electro-magnet $M^5$ the spring $s^2$ causes lever $l\ l$ to be pulled down toward wheel D and detent $d^5$ to catch a pin, $d^4$, which projects from the side of wooden wheel D, holding said wheel from turning. When a locomotive or train, the wheels being connected by metallic axles, moves in the direction indicated by arrow (⇒) Q, and occupies rails $R^4$ $R^5$ of short section of track $A^2$, the side $R^4$ of which is insulated at $s$ from adjacent rails, and the side $R^5$ is metallically connected at $s^1$ with adjacent rails, the circuit of battery $Bb$ will be closed, and the electric current will flow from positive (+) pole of said battery over wire 15, coils of electro-magnet $M^5$, wire 16, rails $R^4$, wheels and axles of the locomotive or train, (here represented by wheels $w'\ w'$ and axle $x^1$,) rails $R^5$, and wire 17, to the negative pole − of battery, thereby charging the cores of magnet $M^5$, and attracting armature $y^2$, thus causing lever $l\ l$ to lift detent $d^5$ and liberate pin $d^4$, when the wheel D will be rotated by weight N and cord $N'$, and a series of alternating opposite currents of electricity from battery B will be sent over the relay M in the primary or main circuit, and cause opposite currents from battery $B^1$ over the secondary or local circuits, and a series of audible or visual signals, or both, will be given, as hereinbefore described.

The lever $l\ l$, when attracted by magnet $M^5$, contacts with metallic point P, and thereby closes the secondary circuit between wires 13 and 14 over point P and lever $l\ l$. As long as the rails of short section of track $A^2$ are occupied by a locomotive or car the magnet $M^5$ is charged and wheel D can rotate; but as soon as the first pair of wheels and axle of said locomotive or car moves off said section, and upon short section $A^3$, the current of battery $Bb$ will flow from its positive pole + over wire 18, rail $R^6$, wheels and axles of the car or locomotive, rails $R^7$ $R^5$, and wire 17 to the negative (−) pole of battery, thereby demagnetizing magnet $M^5$, and allowing spring $s^2$ to pull down lever $l\ l$ on the side toward wheel D and detent $d^5$ to catch pin $d^4$ and hold wheel D from further rotation. In order to prevent a rapid rotation of wheel D being caused by weight N, when the detent is withdrawn from the pin upon the wheel it will be necessary to employ a train of clock-work in connection with shaft $d^3$ of said wheel, said clock-train being so regulated as to allow wheel D to make a portion of or a whole rotation in a certain time, and thereby cause a suitable number of alternating currents to be sent and a suitable series of signals to be given when section of track A is clear and its rails are in proper position and not broken.

Fig. 6 shows the arrangement by means of which my invention may be applied, so that one signaling apparatus will serve for two adjacent sections of a double-track railway, upon which the trains move always in one direction, that indicated by arrow (⇒) Q. This arrangement may also serve for more than two sections. When wheel D of commutator C is rotated, alternate opposite currents are sent from battery B over lines of rails R $R^1$ of section of track A and relay M, and thereby alternately change the polarity of pole $n\ n'$ of relay M, and cause levers $l\ l^1$ to vibrate between metallic points $p\ p^1$ and $p^2\ p^3$, as heretofore described. The vibration of levers $l\ l^1$ between points $p\ p^1$ and $p^2\ p^3$ of relay M causes alternate opposite currents to be sent from battery $B^1$ over rails $R^2\ R^3$ of section of track $A^1$ and relay $M^m$, and alternately changes the polarity of poles $n^2\ n^3$ of relay $M^m$, and thereby causes the levers $l^2\ l^3$ to vibrate between metallic points $p^4\ p^5$ and $p^6\ p^7$, changing the current of battery $B^a$ to alternately opposite directions over wire $L^a$, signal apparatus H, circuit-closer K, and earth-connections G G', and a series of signals to be given as heretofore described.

Any number of adjacent insulated sections of a double-track railway can be placed in combination with each other and with a single signaling apparatus, as just described, and should the rails of either of such sections be occupied by a locomotive or car, or a rail be removed or broken in dry or cold weather, it will be impossible to give a series of signals indicating safety, as all of the circuits must be complete and not shunted, in order to give a safety-signal.

Fig. 7 shows the arrangement of parts when my invention is applied to an insulated section of single-track railway, upon which trains move in both directions, as indicated by arrows ($\longrightarrow$) $Q^a$ ($\longleftarrow$) $Q^b$. In this arrangement a circuit-commutator, a galvanic battery, two ordinary circuit-changers, and one relay-magnet are in combination with the rails $R^a$ $R^b$ at each end of section of track $A^a$, and they constitute, with rails $R^a$ $R^b$, two separate and independent primary circuits, which control two separate and independent local or secondary circuits and two signaling apparatus, $H^a$ and $H^b$, one at each end of section of track $A^a$. The normal position of levers $k^2$ $k^3$ $k^4$ $k^5$ of circuit-changers $K^a$ $K^b$ $K^c$ $K^d$ is in contact with metallic conductors $k^6$ $k^7$ $k^8$ $k^9$, and when a locomotive or train moving in the direction indicated by arrow $Q^a$ ($\longrightarrow$) approaches end $a^1$ of section of track $A^a$, and wheel $D$ of commutator $C$ is rotated, and lever $k$ of circuit closer and breaker $K$ is in contact with conductor $k^1$, and the levers of circuit-changers $K^a$ $K^b$ are moved to contact with conductors $k^{11}$ $k^{12}$, and section of track $A^a$ is clear, and its rails intact, a series of electric currents will flow from battery $B$ and commutator $C$ alternately in opposite directions over circuits composed of spring $F$, wire 4, conductor $k^{11}$, lever $k^2$, wire 5, rails $R^a$, wire 6, lever $k^5$, conductor $k^9$, wire 7, coil $m'$ of relay $M^a$, wire $q$, coil $m$, wire 8, conductor $k^8$, lever $k^4$, wire 9, rails $R^b$, wire 10, lever $k^3$, conductor $k^{12}$, wire 11, and spring $F^1$, causing alternate changes of polarity in the poles $n$ $n'$ of relay $M^a$, and producing a vibratory motion in levers $l^6$ $l^7$ between metallic points $p^6$ $p^7$ $p^8$ $p^9$, thereby directing the current of battery $B^c$ alternately in opposite directions over circuits and signal apparatus $H^a$, for the purpose of producing a series of audible or visual signals, or both, as hereinbefore described.

When a locomotive or train approaches section $A^a$, in the direction indicated by arrow $Q^b$ ($\longleftarrow$,) the action of the commutator circuit-changers $K^c$ $K^d$, conductors, magnet $M^b$, and signaling apparatus $H^b$, and other devices, in combination with ends $a^2$ $a^1$ of section of track $A^a$, is precisely similar to the action just described, and will be readily understood on reference to corresponding parts connected with ends $a^2$ $a^1$. After signaling, the circuits of the main and secondary batteries, at each end of the insulated section of track, should be broken by means of the circuit-closers and breakers heretofore described.

The rails of a railway-track have only been used satisfactorily in this country as conductors of electrical currents for signaling purposes, when the section of track has not exceeded about one mile in length. This is owing to the heavy escape or leakage of electricity, during wet and damp weather, from the rails to the earth, weakening the currents passing over the rails. Consequently, the arrangements shown in Figs. 1, 2, 3, 4, and 5 will only apply to insulated sections of double-track railway not exceeding about one mile in length, and should the length of a portion of double-track railway to be protected by one signal apparatus exceed one mile, it will be necessary to divide it into two or more sections, and operate them as explained with reference to Fig. 6.

The arrangement shown in Fig. 7 will only apply to an insulated section of single-track railway not exceeding about one mile in length, and should the length of a portion of single-track railway to be protected by two signal apparatus, one at each end, exceed one mile, it will be necessary to divide said portion of track into two or more sections, which should be operated in combination with each other, and with the two signaling apparatus, in a manner similar to that shown in Fig. 6, but with the addition of devices and circuits that are necessary to apply the said arrangement to two or more sections of single-track railway, and the construction and manner of applying which will be obvious to any one familiar with electrical signals or other electrical apparatus.

Any electric railway-signaling apparatus which is based upon the principle of producing a signal by the action of one current, or one interruption of current, is liable to be influenced in exactness by atmospheric electricity, such as produces lightning, aurora borealis, earth-currents, &c., and by other accidental currents; also, by contact of conductors thereof with another line, and, therefore, is apt to give a wrong signal and endanger the trains of a railway upon which such apparatus is used.

In the several modifications of my invention shown and described, the conductors composing the primary or main circuits, and local or secondary circuits, are liable at any time to receive a current of atmospheric electricity, or a current from some other source than that employed for the production of proper action of the signal apparatus, but the only effect such atmospheric or accidental current of electricity could have upon the secondary circuit, or primary and secondary circuits and the signaling apparatus, when the secondary circuit is closed, would be to give a single bell-tap or a single movement of the semaphoric signal. The object, therefore, of employing and depending upon a series of alternately opposite or reverse currents of electricity to pass over the said primary, or both primary and secondary circuits, and give a series of bell-taps, or a series of movements of a semaphoric signal, or both, at regular intervals, to indicate safety, as hereinbefore described, is to prevent the liability of a safety-signal being given by a current or currents of atmospheric electricity, or a current or currents from any other source than that regularly employed in connection with the rails and signaling apparatus, as hereinbefore described.

In the modification shown in Fig. 4, the wires of the secondary circuit can be insulated and placed in a building or signal-box or station, so as not to be liable to be affected by atmospheric or accidental currents of electricity, and, therefore, a series of currents alternately charging electro-magnets on opposite sides of a soft-iron signal-lever may be used, instead of alternately changing the polarity of opposite poles of one electro-magnet in order to operate a polarized signal-lever.

Instead of employing a bell or semaphoric signal apparatus, in the modification shown in Fig. 4, an induction-coil, without circuit-breaker attached, and a Geissler tube can be substituted, with the wire 7 being connected, as shown in Fig. 8, to one connecting-screw, T, of primary wire of said induction-coil, and wire 8 to the other connecting-screw $T^1$ of the primary wire of said induction-coil, and wire 10 to wire 7, so that when a series of currents of battery $B^1$ pass over the primary coil of said induction-coil a series of currents will be induced in the secondary wire of the induction-coil, which, passing over connecting-screw $T^2$ of the secondary wire, wire 11, platinum connection $u^1$ of vacuum or Geissler tube U, platinum connection $u^2$, wire 12, and connecting-screw $T^3$ of the secondary wire, causes a series of flashes of light at short and regular intervals to be given in said tube, thereby indicating safety.

The secondary circuit, described with reference to Fig. 4, consisting of battery $B^1$, circuit-closer K, wires 6, 7, 8, 9, 10, and 11, also the signal apparatus H, could be dispensed with, and a safety-signal indicated to a signalman at a railway-station by the oscillation of lever $l^4$ of magnet $M^4$ between points $p$ $p^1$, or two small bells or gongs; or said lever $l^4$ could operate any other audible or visual signal or both, and instead of the said magnet and lever a galvanometer or any other sensitive electrical apparatus may be substituted, and the needle or movable part or parts thereof be employed to indicate a safety-signal when actuated by the alternately opposite or reverse currents, as hereinbefore described.

Instead of the employment and arrangement of springs E $E^1$ $E^2$, long or continuous strips $C^1$ $C^2$ $C^3$, and three sets of short strips, $c^1$ $c^2$ $c^3$, upon the periphery of wheel D of commutator C, as shown in Fig. 1, two sets of short alternate strips, $c^1$ $c^2$, upon the periphery of said wheel D can be employed, as shown in Fig. 9. The short strips $c^1$ are connected together by wires or conductors 21, and insulated or separated from strips $c^2$, which are also connected together by wires or conductors 22. The strips $c^1$ and conductors 21 are connected to metallic shaft $d^6$ by a wire or conductor, 33, and strips $c^2$ and conductors 22 are connected to metallic shaft $d^7$ by wire or conductor 44. The wooden wheel D is fastened to and insulates from each other the metallic shafts $d^6$ $d^7$, which rest and revolve upon bearings formed in metallic standards $v$ $v^1$. When wheel D and shafts $d^6$ $d^7$ rotate, opposite or reverse currents of battery B will be transmitted over wire 1, standard $v$, shaft $d^6$, wire or conductor 33, strips $c^1$, conductors 21, springs F $F^1$, strips $c^2$, conductors 22, wire or conductor 44, shaft $d^7$, standard $v'$, wire 2, and the conductors connected with springs F $F^1$, hereinbefore described.

Instead of employing commutator C, wires 1 2 3 or 1 2, and battery B, Figs. 1 and 9, for generating and transmitting a series of alternate opposite or reverse currents, as hereinbefore described, a magneto-electric inductor may be substituted, consisting of permanent magnets, between the poles of which a coil of insulated wire on a rotating armature of soft iron develops, on being turned on its axis, opposite or reverse currents of electricity; and the said coil and armature may be rotated either by a signalman or automatically, by the devices, shown in Fig. 5, for automatically operating commutator C.

Instead of employing a magneto-electro inductor in which the coil of insulated wire and armature rotates, an inductor can be substituted, in which the coil of wire and armature, when oscillated between the poles of a permanent magnet or magnets by a signalman, or by a locomotive or train, develops opposite or reverse currents of electricity.

Figure 10:
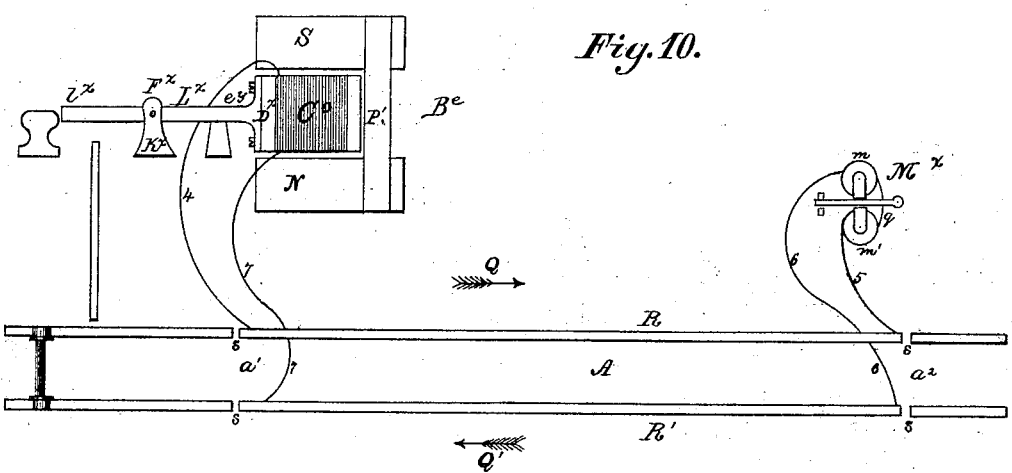

In Fig. 10 is represented a magneto-electric inductor, $B^o$. S and N are two rows of permanent bar-magnets, the upper ones with their north ends and the lower ones with their south ends in contact with a plate, P', of soft iron, which acts as a neutral block for all the permanent magnets. $D^x$ is the soft-iron armature, in which deep longitudinal grooves, on opposite sides, are cut, and in these grooves the coil $C^c$ of insulated wire is wound. $L^x$ is an iron lever, which vibrates on its fulcrum $F^x$ on standards $K^x$, and which is attached by screws to armature $D^x$. When the lever $L^x$ is depressed at end $l^x$ by the wheel of a locomotive or car the armature $D^x$ and coil $C^c$ of insulated wire is elevated and brought near magnets S, thereby causing a magneto-electric current to be induced in the coil $C^c$ and to flow over wire 4, rails R, wire 5, magnet $m'$, wire $q$, and magnet $m$ of relay-magnet $M^x$, wire 6, rails $R^1$, and wire 7, in one direction, and after the said wheel has passed over said end of the lever the end $l^y$ of said lever will descend, owing to the weight of the armature and coil, which will then be brought near to magnets N, thereby causing another magneto-electric current to be induced in the coil opposite to the first current and flowing over wire 7, rails R¹, wire 6, the coils of the magnet M$^x$, wire 5, rails R, and wire 4. In this manner a series of opposite or reverse currents can be generated and transmitted over the primary circuit and over a secondary circuit connected with relay M$^x$, as hereinbefore described, and a series of signals given, or a single signal given, which depends upon a series of opposite or reverse currents of electricity. The end $l^x$ of the lever L$^x$ can also be arranged to be depressed by a rail or spring-bar when occupied by the wheels of a locomotive or car.

The arrangement shown in Fig. 10 can be modified and employed to give a series of signals, audible or visual, or both combined, at a street or road crossing, to indicate that a train is approaching said crossing, both on a double and single track railroad, by placing an inductor similar to B$^e$ on each side of said crossing, so as to be operated by trains moving in opposite directions, at suitable distances from said crossing, and connecting said inductors by wires to one (if a single-track railroad) or two (if a double-track railroad) short sections of track at the crossing, and arranging lever of M$^x$, which is connected to the said short section or two sections at crossing, to operate an audible or visual signal, or both, as hereinbefore described.

The semaphoric signal Y in Fig. 1 can be arranged so as to be revolved by means of a weight or spring, and be controlled by lever J, escapement $j$, toothed wheel Z, or other devices, so that after said lever J has made a certain number of vibrations between poles $i$ $i$ of magnets I I¹ the said signal, which is held in check, will be released and allowed to make one movement or revolution, and thereby indicate safety.

Having now fully described the construction and operation of my invention, I claim and desire to secure by Letters Patent—

1. The combination of one or more insulated sections of railway-track, a main or primary battery and commutator, circuit-changing relay-magnets, and local or secondary batteries an electric signaling apparatus, and intermediate conductors between the foregoing, arranged and operated for producing a series of signals in said signaling apparatus, or a single signal by a series of reverse currents, substantially as described.

2. The combination of insulated section A of railway-track, battery B, commutator C, relay-magnet M, levers $l$ $l^1$, metallic points $p$ $p^1$, $p^2$ $p^3$, battery B', wires 5, 6, 9, 10, 11, 12, 8, and L, and electric signaling apparatus H, arranged and operating substantially as described.

3. The combination of two insulated sections of railway-track, A A¹, main or primary battery B, commutator C, relay-magnet M, levers $l$ $l^1$, metallic points $p$ $p^1$ $p^2$ $p^3$, battery B¹, wires 5, 6, 9, 10, 11, 12, 13, 14, 8, and L$^a$, electric signaling apparatus H, and relay-magnet M$^m$, battery B², ground-plates G G', and intermediate conductors connecting the two sections A A¹, all arranged and operating substantially as shown and described.

4. The combination of signal-disk Y, shaft $o^2$, toothed wheel Z, escapement $j$, lever J, and poles $i$ $i'$ of an electro-magnet, substantially as described.

5. Relay-magnet M, having levers $l$ $l^1$, which are insulated from each other and vibrate respectively between metallic points $p$ $p^1$ $p^2$ $p^3$, in combination with battery B¹, signaling apparatus H, and intermediate conductors of a local or secondary circuit, substantially as described.

6. Magneto-electric inductor B$^e$, the armature D$^x$ of which and wire coil are vibrated by lever L$^x$ between magnets S N, in combination with the rails of a railway-track, substantially as and for the purpose set forth.

7. Geissler tube U, in combination with an induction-coil, in which the primary current of battery B¹ is opened and closed by lever $l^4$ of relay M⁴, oscillating between metallic points $p$ $p^1$, as described.

8. An insulated section of single-track railway, having arranged at each end thereof a main or primary battery and commutator connected with a polarized relay-magnet at the end of section opposite the end where the battery is, each of said relays controlling an electric signal at a distance from it, substantially as described.

In testimony that I claim the foregoing as my own invention, I affix hereto my signature in presence of two witnesses.

HENRY W. SPANG.

Witnesses:
C. T. SELLERS,
E. R. ADAMS.